Oct. 7, 1941.  E. C. HORTON  2,258,009
MOTOR VEHICLE ACCESSORY
Filed March 28, 1938   3 Sheets-Sheet 1

INVENTOR
Erwin C. Horton,
BY
Bean, Brooks, Buckley & Bean
ATTORNEYS

Oct. 7, 1941.  E. C. HORTON  2,258,009
MOTOR VEHICLE ACCESSORY
Filed March 28, 1938  3 Sheets-Sheet 2
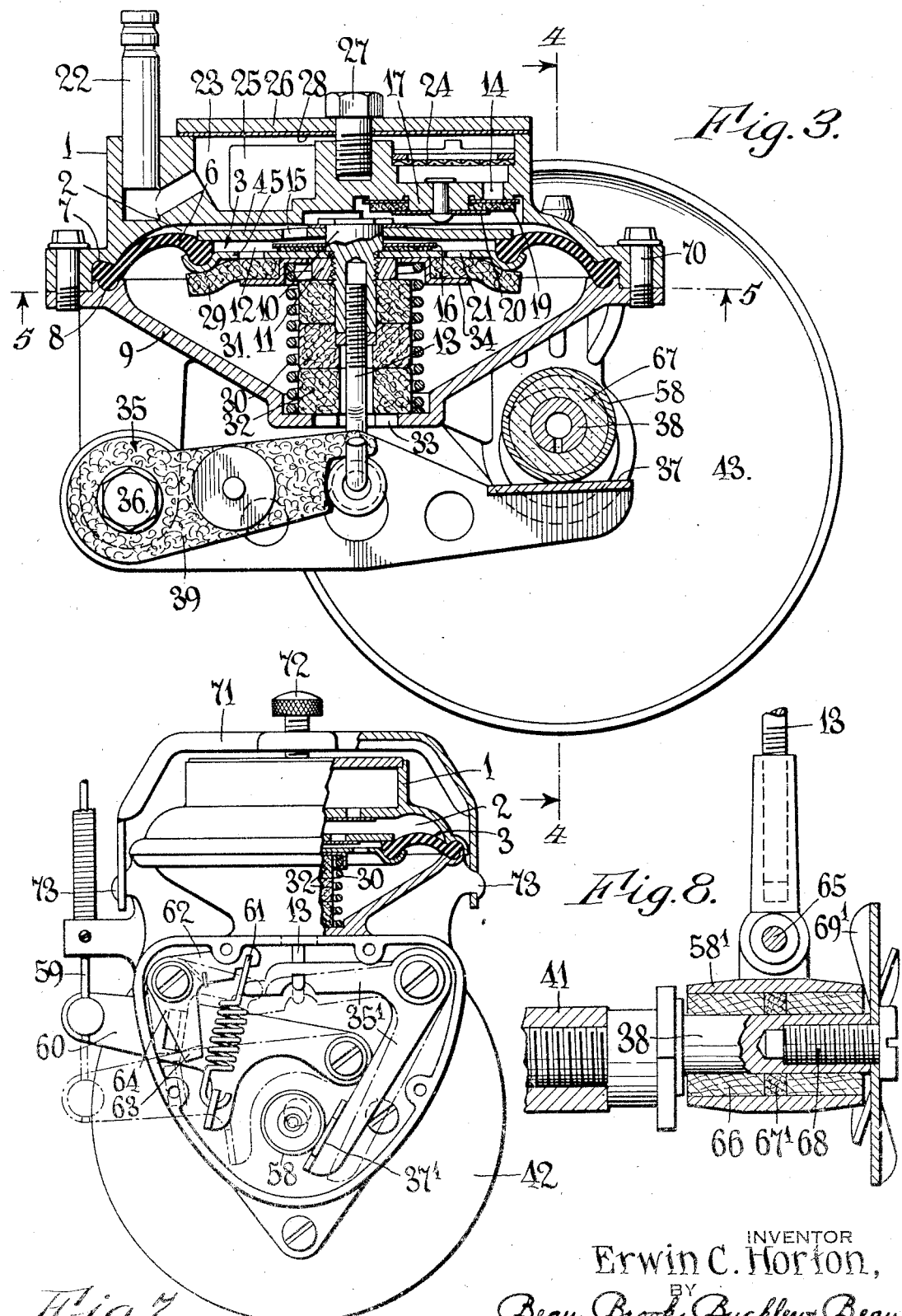
INVENTOR
Erwin C. Horton,
BY
Beau, Brooks, Buckley & Beau.
ATTORNEYS

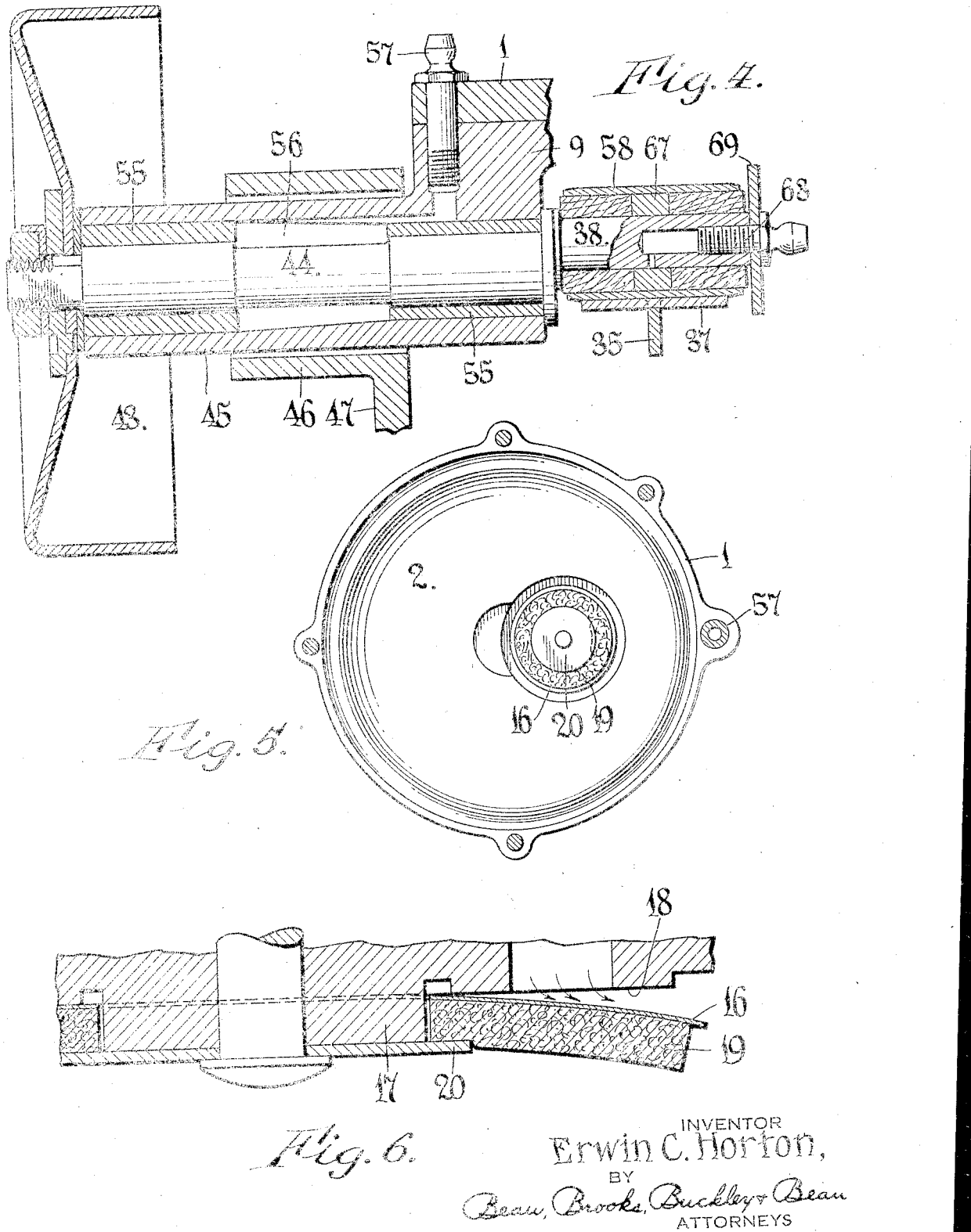

Patented Oct. 7, 1941

2,258,009

UNITED STATES PATENT OFFICE 2,258,009

MOTOR VEHICLE ACCESSORY

Erwin C. Horton, Hamburg, N. Y., assignor to Trico Products Corporation, Buffalo, N. Y.

Application March 28, 1938, Serial No. 198,532

6 Claims. (Cl. 230—171)

This invention relates to a motor vehicle accessory system and primarily to an air pump adapted to be driven from a moving part of the vehicle to serve as a source of actuating pressure for an accessory thereof.

The present invention has for its object to provide a high speed, short stroke pump wherein the parts are so mounted and disposed as to cooperate effectively in generating a reliable and uniform degree of pressure influence at low as well as high speeds of operation of the pump.

Also, the invention resides in an improved mechanism for driving the pump piston from the motor vehicle power plant by which the installation on the latter is facilitated in a practical manner, and further the invention aims to provide a pump which is long lived, the parts being so designed and combined as to make a durable pump which is economical in manufacture.

In the accompanying drawings,

Fig. 3 is a transverse section through the pump;

Fig. 4 illustrates fragmentarily and in section the pump drive, taken on line 4—4, Fig. 3;

Fig. 5 is a bottom plan view of the upper section of the pump housing, as viewed on line 5—5, Fig. 3;

Fig. 6 is an enlarged view through one of the pump valves illustrating generally its action;

Fig. 7 illustrates a modified construction; and

Figs. 8 and 9 are respectively longitudinal and transverse sections through another form of pump drive.

Figure 1:
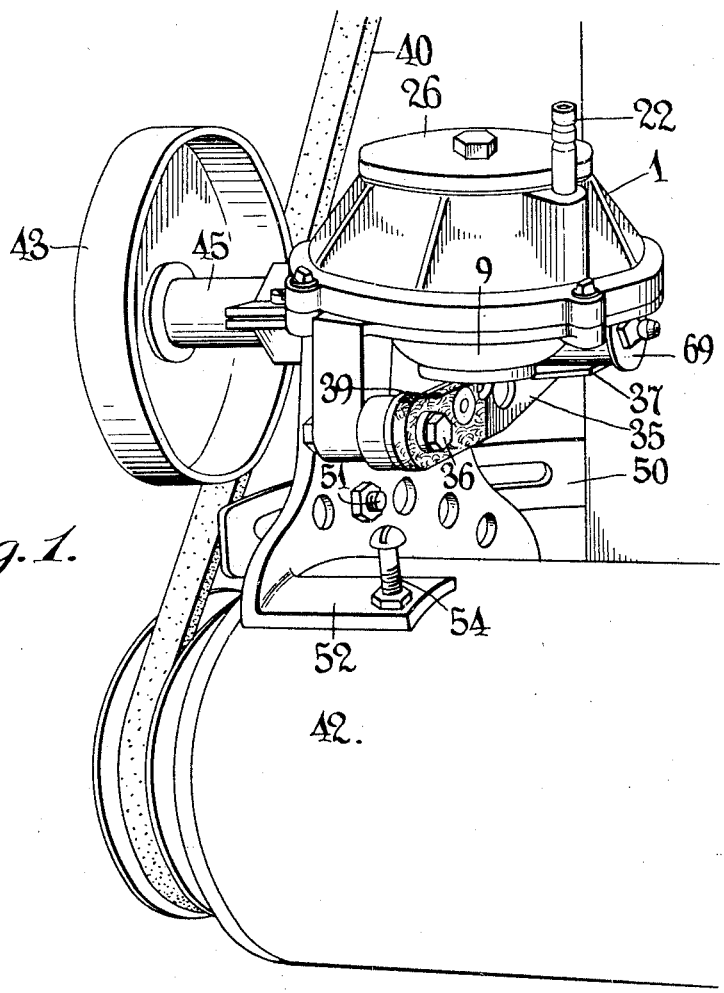
Fig. 1 is a perspective view of the pump showing it operatively related to its drive.

Referring more particularly to the drawings, the numeral 1 designates the main or cap section of the pump housing and 2 the chamber thereof which is alternately enlarged and ensmalled by the fluid displacing member or piston generally indicated at 3.

The piston is of the diaphragm type and embodies a pair of body plates 4 and 5 which have their marginal portions embracing the inner edge of an annular webbing or diaphragm 6. The outer edge of the diaphragm is firmly held between a seat 7 in the housing section 1 and a seat 8 in the companion or mounting section 9. The diaphragm 6 is preferably formed of rubber which, owing to its elastic nature, will stretch or yield without buckling or folding during operation. The intermediate portion of the diaphragm may be formed with a permanent arch to further guard against folding upon itself and thereby weakening its structure. The body plates 4 and 5 of the piston are secured together at their centers by the tubular bolt 10 and its nut 11, with the plates being spaced apart for forming a valve chamber 12 hereinafter referred to. The tubular bolt is internally threaded to adjustably receive the threaded end of a connecting rod 13.

The pump chamber 2 is provided with an inlet port 14 and an outlet port 15, the latter being preferably provided in the piston and opening into the valve chamber thereof. Each port is controlled by a valve which is flexible and freely movable in action and comprises a flat annular member 16 held on the valve seat 18 by an overlying piece of felt 19 so light as to be readily carried with the valve without materially retarding its opening progress and at the same time providing a slight resiliency for urging it toward its seat. Both valves are loosely guided, the inlet valve on a boss 17 and the outlet valve on bolt 10. A retaining disk 20 holds the backing felt on the inlet valve while the plate 5 of the piston assembly serves a like function in connection with the felt of the outlet valve, the plate 5 being provided with one or more openings 21 through which the air may leave the valve chamber 12.

The valves are sufficiently light to float or move promptly with changes in the direction of flow of the air currents. For example, a brass valve having a thickness of .002 of an inch has proved practical by reason of its quick response to directional changes in air flow. Each valve is flexible in character to render it self-conforming to its seat and thereby effect a better sealing contact between the valve and the seat, and while the valve is bodily movable to and from its operative position, its valving action is also reed-like with the line of bend progressing more or less at opposite sides of its center guide depending upon the rapidity of movement, the inertia and possibly other factors which retard the bodily lifting of the entire valve from its seat. This is especially so when the valve port is disposed to one side of the guiding boss, the air movement flexing the valve at one side from its seat regardless of the delay in the opposite side portion of the valve to follow such given tendency. By reason of its loose mounting on the guiding boss the valve is free to creep in a circular path about the boss and thereby present an ever changing valve portion to the seat.

The pump has a nipple 22 for connection to an air or suction operated accessory, such as a windshield cleaner, and this nipple discharges into a chamber 23 at one side thereof. The inlet port 14 opens from the opposite side of the chamber through a filter or screen 24. Between the port 14 and the nipple 22 the chamber may be provided with one or more baffles 25 which serve to dampen the pulsations. The chamber 23 is accessible upon removal of a cover plate 26 which is detachably secured as by the screw 27, a suitable packing gasket 28 underlying the closure plate 26.

To dampen the exhaust noises, the piston openings 21 are covered by a felt disk 29 within the chamber 31. In addition, a fibrous body 32, which is composed of a stack of lightly felted disks and is enclosed by the spring 30 about connecting rod 13, serves to muffle the exhaust from chamber 31 by way of an opening 33 through which the connecting rod 13 freely moves unguided by the walls thereof. The disk 29 is held in position by a retainer 34 on which the upper end of the spring seats. The connecting rod joins a lever 35 fulcrumed at one end on a support 36 on the mounting section of the housing, while the opposite end of the lever is provided with a shoe 37 for riding on a driving crank or eccentric 38. An oil retaining felt 39 is carried by this lever to lubricate the fulcrum as well as the connecting rod bearing.

Figure 2:
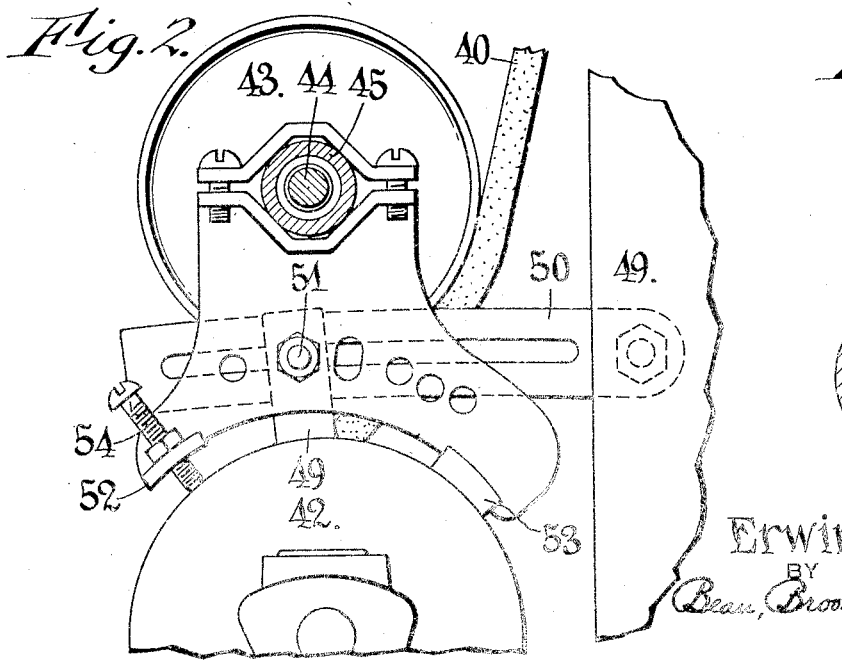
Fig. 2 depicts more clearly the mounting of the pump.

The pump is operated from the motor vehicle power plant, such as from the fan belt 40 or from the shaft 41 of the generator 42. For deriving power from the fan belt a pulley 43 is provided on the drive shaft 44 which carries the crank 38. The shaft is journaled in a bearing sleeve 45 on the mounting section, and this sleeve is removably clamped in a seat 46 on the bracket 47, as shown in Fig. 2. The bracket may be conveniently mounted so as to have the pulley 43 properly bear on the belt. Where the generator carried ear 48 is supported from the engine block 49 by an arm 50, to which latter the ear is adjustably fastened with bolt 51, the pump bracket 47 may be anchored by the latter fastener and, by reason of the bracket feet 52 and 53 resting at opposite sides of the bolt on the generator housing, a tri-point support is provided for the pump bracket. This support is made firm and secure with a set screw 54 which, when turned against the generator housing, will tend to rock the bracket on the bolt 51 and force the foot 53 down solidly on the housing.

The drive shaft 44 is mounted in porous bronze or like bushings 55 pressed into the opposite ends of the bearing sleeve 45, and between these bushings a lubricant chamber 56 is provided into which a quantity of the lubricant may be forced through the nipple 57. A roller 58 is freely rotatable on the driving crank 38 to ease its engagement with the shoe 37, which engagement may be prevented, as shown in Fig. 7, by manually pushing on the control wire 59 (accessible to the motorist) to depress the lever 60 for placing a connected spring 61 under tension sufficient to swing the bell crank 62 against the adjacent end of pump lever 35' and remove the shoe 37' from the eccentric roller 58. During this tensioning movement the bell crank 62 is restrained by a down turned lug 63 on the latter engaging a shoulder 64 on the lever 60, the shoulder being long enough to restrain the bell crank until the spring has been properly tensioned, following which the shoulder rides from beneath the down-turned lug to release the bell crank, as shown by the broken lines.

As previously stated, it is undesirable to buckle the diaphragm back and forth during operation and consequently the extent of piston movement is small. By way of example, the total throw of the crank 38 when determined at approximately .170 of an inch has been found to be satisfactory and practical for both fast and slow piston operation without subjecting the parts to unnecessary wear and tear and at the same time give the desired degree of suction or vacuum for the efficient operation of air driven accessories.

The degree of suction or operating pressure may be regulated by varying the clearance space in the pump chamber. This is accomplished herein by adjusting the effective length of the connecting rod 13 whereby the uppermost position of the piston may be determined. The more the clearance in chamber 2 is reduced at the uppermost position of the piston, the greater will be the degree of vacuum produced by the pump.

Figure 9:
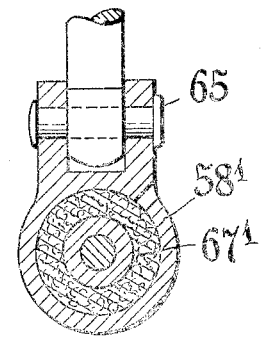

The lower end of the composite connecting rod may be joined to a bearing sleeve 58' by a transverse pivot pin 65 which permits a certain amount of relative movement incidental to the unguided reciprocation of the connecting rod. For greater efficiency and durability, the roller 58 (or sleeve 58') is provided with spaced bushings 66 enclosing a lubricating member 67 of porous bronze (Fig. 4) or it may be an oil saturated felt body 67' (Figs. 8 and 9), the supply of lubricant being conveniently replenished through suitable apertures.

The divided bushing 66 is preferably formed of oil impregnated wood since it stands up well at high speed and requires little lubrication. However, wood is a poor conductor of heat and when the pump is operating at a speed of several thousand revolutions a minute the heat generated would ordinarily be so great as to readily impair the bearing. To avoid this, means are provided to dissipate the heat generated, herein illustrated as comprising a heat conducting rod 68 which will readily absorb and transmit the heat from the crank pin and maintain the latter at a comparatively low temperature. The heat conducting rod may be of aluminum, by way of example, and is fitted into an axial bore formed in the outer end of the crank, such heat transmitting pin extending sufficiently into the crank pin to draw the heat from that portion of the pin which is rotating in the bushing 66. Fixed to the outer end of the heat transmitting rod is a heat dissipating disk 69 which may have its heat discharging capacity increased by being radially slitted at intervals and having the divided portions offset to increase the air flow thereover for greater heat dissipation, as shown at 69', Fig. 8. This provides a simple and effective means for maintaining the crank bearing cool and thus avoid burning out the bearing while operating at excessively high speeds of rotation, the power transmitting roller or sleeve being assured proper support for greater efficiency.

The sections of the pump housing may be secured together in any suitable manner, as by screws 70, or one housing section may be formed with hooks 73 for detachably anchoring the bail 71 which carries a set screw 72 to exert clamping pressure on the two sections.

The pump is efficient in operation because of the light valve bodies which readily flex and move bodily both axially as well as transversely. The fibrous backing may be dispensed with but it is desired because it tends toward quietness in operation and provides a slightly resilient support for the valve. This felt is very lightly matted and consequently places practically no additional burden on the valve.

While the foregoing description has been given in detail it is merely illustrative of the inventive principles involved which may be applied to other physical embodiments without departing from the scope and spirit of the invention claimed.

What is claimed is:

1. An air pump having a chamber, a piston having an annular flexible body secured about its periphery to the wall of the chamber and a pair of body plates clamping the inner edge of the body and held spaced apart thereby to form a valve compartment between the plates, an air floated valve loosely confined in the compartment for controlling the air movement therethrough, said valve being free of the plates and bodily movable therebetween, and means for actuating the piston.

2. An air pump having a chamber, a piston having an annular flexible body secured about its periphery to the wall of the chamber and a pair of body plates clamping the inner edge of the body and held spaced apart thereby to form a valve compartment between the plates, an air floated valve loosely confined in the compartment and bodily movable between the plates, an actuating lever, an unguided connection between the lever and the piston whereby the body plates may rock as well as move axially within the flexible body, and means for oscillating the lever.

3. A pump having a reciprocable fluid displacing member, and means for actuating the displacing member, said means including a driving crank, a power transmitting member encircling the crank and bearing directly thereon for relative rotary movement, and a heat conducting pin extending axially from within the crank and projecting from the end thereof free of said power transmitting member.

4. A pump having a reciprocable fluid displacing member, and means for actuating the displacing member, said means including a driving crank, means operatively connecting the crank to the displacing member including a fibrous member bearing directly on the crank for relative rotary movement, a heat conducting pin within the crank and extending axially therefrom through one end thereof, and a heat dissipating disk carried by the pin outwardly beyond and spaced from the encircling member.

5. A high speed air pump having a chamber and an air displacing member operable therein, said displacing member having a rigid central portion and a stretchable marginal portion, the outer edge of the marginal portion being anchored to the chamber wall, means connected to the central portion for supporting and reciprocating the same wholly to one side of the plane of anchorage and with a short stroke, the marginal portion being supported taut at all times, and air passages for the chamber having valve means for providing uni-directional flow of air through the chamber, the valve means for each passage comprising a thin body responsive to rapid changes in air flow through the passage and supported to one side of the passage for bodily movement, the body being also flexible to yield in addition to the bodily movement for more ready response to such changes in air flow.

6. A pump having a reciprocable fluid displacing member and means for actuating the displacing member, said means including a driving crank, a power transmitting member encircling the crank, a fibrous oil impregnated bushing interposed between the crank and the encircling member, a heat conducting pin extending axially from within the crank through the free end portion thereof, and a porous heat conducting part forming a portion of the fibrous bushing substantially midway between its ends and having metal contact with the crank and said encircling member to serve to conduct heat away from the crank.

ERWIN C. HORTON.